(12) United States Patent
Bhogulkar et al.

(10) Patent No.: US 12,392,075 B2
(45) Date of Patent: Aug. 19, 2025

(54) SHIPPING SPACER ASSEMBLY FOR WASHING MACHINES

(71) Applicant: Haier US Appliance Solutions, Inc., Wilmington, DE (US)

(72) Inventors: Sushant Maruti Bhogulkar, Karnataka (IN); Ravikumar Anburaj, Tamilnadu (IN); Srikanth Gopireddy, Telangana (IN); Pavan Kumar Madeti, Andhra Pradesh (IN); Veera Venkata Anil Bhaskar Prasad Seereddy, Hyderabad (IN); Venkata Chakradhar Rangu, Louisville, KY (US); Neelapala Gopinath Yadav, Hyderabad (IN); Ajay Kumar Kommagalla, Hyderabad (IN); Kalyana Swamy Mallavarapu, Hyderabad (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 398 days.

(21) Appl. No.: 17/883,133

(22) Filed: Aug. 8, 2022

(65) Prior Publication Data

US 2023/0416969 A1    Dec. 28, 2023

(30) Foreign Application Priority Data

Jun. 24, 2022   (IN) .............................. 202211036368

(51) Int. Cl.
*D06F 39/00*    (2024.01)
*D06F 23/04*    (2006.01)
(Continued)

(52) U.S. Cl.
CPC ............ *D06F 39/001* (2013.01); *D06F 23/04* (2013.01); *D06F 34/10* (2020.02); *F16B 43/00* (2013.01)

(58) Field of Classification Search
None
See application file for complete search history.

(56) References Cited

U.S. PATENT DOCUMENTS 2,386,788 A * 10/1945 Peter ....................... D06F 37/24
                                                            248/603
7,441,420 B2   10/2008 Kim et al.
(Continued)

FOREIGN PATENT DOCUMENTS

CN      201045091 Y  *  4/2008
CN      204099377 U     1/2015
(Continued)

OTHER PUBLICATIONS

Bolt Science, "The Use of Two Nuts to Prevent Self Loosening", https://www.boltscience.com/pages/twonuts.htm (Year: 2019).*

*Primary Examiner* — Omair Chaudhri
(74) *Attorney, Agent, or Firm* — Dority & Manning, P.A.

(57) ABSTRACT

A shipping spacer assembly is configured to be removably attached to a wash tub of a washing machine for fixing a distance between a wash tub and a cabinet of a washing machine appliance in an installed position. The shipping spacer assembly includes a bolt, a cord retention mechanism, and a grommet. The bolt includes a shaft extending along an axial direction, a head located at one end of the shaft, and a threaded portion located opposite the head in the axial direction. The cord retention mechanism is configured for receipt of a power cord. The cord retention mechanism is positioned between the head of the bolt and the rear panel in the installed position. The grommet defines a grommet cavity. The shaft is removably positioned through the grommet cavity.

20 Claims, 8 Drawing Sheets

(51) Int. Cl.
*D06F 34/10* (2020.01)
*F16B 43/00* (2006.01)

(56) References Cited

U.S. PATENT DOCUMENTS

| | | | |
|---|---|---|---|
| 9,290,881 B2 | 3/2016 | Jun et al. | |
| 10,787,763 B2 | 9/2020 | Zhang et al. | |
| 10,837,136 B2 | 11/2020 | Rineer et al. | |
| 11,879,496 B2 * | 1/2024 | Xie | F16B 43/025 |
| 2004/0118167 A1 * | 6/2004 | Kim | D06F 39/001 |
| | | | 68/3 R |
| 2009/0074535 A1 * | 3/2009 | Roberts | F16B 21/09 |
| | | | 411/166 |
| 2012/0012716 A1 * | 1/2012 | Lien | F16L 3/1207 |
| | | | 29/446 |
| 2019/0112743 A1 | 4/2019 | Kim et al. | |
| 2019/0338456 A1 * | 11/2019 | Pacho Millán | F16B 21/09 |
| 2020/0141039 A1 | 5/2020 | Cho et al. | |
| 2020/0199802 A1 * | 6/2020 | Rineer | B65D 85/68 |
| 2021/0198830 A1 * | 7/2021 | Chun | D06F 37/04 |

FOREIGN PATENT DOCUMENTS

| | | | | |
|---|---|---|---|---|
| CN | 206000833 U | * | 3/2017 | |
| CN | 108589179 A | * | 9/2018 | D06F 39/001 |
| CN | 211420632 U | | 9/2020 | |
| DE | 19852129 A1 | * | 5/2000 | D06F 39/001 |
| EP | 2132367 B1 | * | 1/2011 | D06F 39/001 |
| EP | 2175061 B1 | | 2/2011 | |
| EP | 2313330 B1 | | 1/2017 | |
| EP | 2342376 B1 | * | 6/2017 | D06F 39/001 |
| EP | 4015695 A1 | * | 6/2022 | D06F 39/001 |
| ES | 2216916 T3 | | 11/2004 | |
| ES | 2281263 A1 | * | 9/2007 | D06F 39/001 |
| GB | 2043707 A | * | 10/1980 | D06F 37/269 |
| KR | 19990012987 U | | 4/1999 | |
| KR | 20050113977 A | | 12/2005 | |
| WO | WO-2007039594 A1 | * | 4/2007 | D06F 39/001 |

\* cited by examiner

SHIPPING SPACER ASSEMBLY FOR WASHING MACHINES

FIELD OF THE INVENTION

The present subject matter relates generally to appliances, and more particularly to washing machine appliances.

BACKGROUND OF THE INVENTION

Washing machine appliances generally include a wash tub housed within a cabinet. A wash basket is rotatably mounted within the wash tub and defines a wash chamber for receipt of articles for washing during a wash cycle. During the wash cycle, the wash basket rotates and agitates articles or wash fluid to wash the articles. The wash tub may move or vibrate within the cabinet during the wash cycle. One or more suspension devices of the washing machine appliance may suspend the wash tub within the cabinet and allow some movement relative to the cabinet during operation. The suspension devices generally allow the tub to move relative to the cabinet during operation of the washing machine appliance.

Notably, vibrations that may be experienced during the transportation of the washing machine appliance may overwhelm the suspension devices, resulting in premature wear or damage to one or more components of the appliance. Accordingly, shipping bolts and spacers are commonly used to secure the tub to the cabinet to make the washer rigid and to ensure the safe handling of the washing machine appliance during shipping or other transport. After the washing machine appliance is installed, the shipping bolts and spacers should be removed prior to operating the machine. However, sometimes the shipping bolts and spacers are inadvertently left in the washer at the time of installation. If these bolts and spacers are not removed, the suspensions of the wash tub will not be activated and there will be a lot of noise and vibration. These issues result in customer dissatisfaction, damage to the appliance or surrounding property, or additional service visits or maintenance costs.

Accordingly, measures for simplifying the installation and transport of washing machine appliances would be desirable. Additionally or alternatively, a stabilization measure that entices its removal from the wash tub prior to use of the washing machine appliance would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a washing machine appliance is provided. The washing machine appliance may include a cabinet having a rear panel, a wash tub located within the cabinet, a power cord configured to connect the washing machine appliance to an external power source and a shipping spacer assembly. The shipping spacer assembly may be removably attached to the wash tub for fixing a distance between the wash tub and the cabinet in an installed position. The shipping spacer assembly may define an axial direction, a radial direction, and a circumferential direction. The shipping spacer assembly may include a bolt, a cord retention mechanism, and a grommet. The bolt may include a shaft extending along the axial direction, a head located at one end of the shaft, and a threaded portion located opposite the head in the axial direction. The cord retention mechanism may be configured for receipt of the power cord and may be located along the shaft of the bolt. The cord retention mechanism may be positioned between the head of the bolt and the rear panel when the shipping spacer assembly is in the installed position. The grommet may define a grommet cavity, the shaft removably positioned through the grommet cavity.

In another exemplary aspect of the present disclosure, a shipping spacer assembly is provided. The shipping spacer assembly may be configured to be removably attached to a wash tub of a washing machine appliance for fixing a distance between the wash tub and a cabinet of the washing machine appliance in an installed position. The shipping spacer assembly may define an axial direction, a radial direction, and a circumferential direction. The shipping spacer assembly may include a bolt, a cord retention mechanism, and a grommet. The bolt may include a shaft extending along the axial direction, a head located at one end of the shaft, and a threaded portion located opposite the head in the axial direction. The cord retention mechanism may be configured for receipt of a power cord and may be located along the shaft of the bolt. The cord retention mechanism may be configured to be positioned between the head of the bolt and the cabinet when the shipping spacer assembly is in the installed position. The grommet may define a grommet cavity, the shaft removably positioned through the grommet cavity.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Use of the same of similar reference numerals in the figures denotes the same or similar features unless the context indicates otherwise.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. Terms such as "inner" and "outer" refer to relative directions with respect to the interior and exterior of the appliance, and in particular the chamber(s) defined therein. For example, "inner" or "inward" refers to the direction towards the interior of the appliance. Terms such as "left," "right," "front," "back," "top," "rear," or "bottom" are used with reference to the perspective of a user accessing the appliance (e.g., when the door is in the open position). For example, a user stands in front of the appliance to open a door and reaches into the internal chamber(s) to access items therein.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

Aspects of the present subject matter advantageously provide a washing machine appliance that may provide a stable shipping situation, with a wash tub internal to the washing machine appliance secured during shipment. Further, the present subject matter may provide a way to remove a shipping spacer assembly, which includes a bolt, a cord retention mechanism and a mechanism configured to fix the distance between the wash tub and the cabinet of the washing machine appliance. By attaching the shipping spacer assembly to a power cord of the washing machine appliance and making the power cord inaccessible without removal of the shipping spacer assembly from the washing machine, the chance of the shipping spacer assembly remaining in the washing machine after installation may be greatly reduced.

By orienting a cord retention mechanism to be irremovable from the bolt of the shipping spacer assembly until removal of the bolt from the appliance, removal of the shipping spacer assembly and accessing the power cord are performed in one step instead of two separate steps of installation, the shipping spacer assembly may be removed with the step of accessing the power cord instead of as a separate step when installing the appliance. Further, the step of accessing the power cord may be a more generally well-known step than the step of removing the shipping bolts, so combining these steps may advantageously result in fewer service calls associated with spacers left in washing machines after installation. Bolts left in washing machines after installation may lead to improper functioning of suspension systems within the washing machine and may lead to walking or movement of the washing machine appliance during use following installation. Removal of bolts as a part of attaching the washing machine to a power source may increase correct installation practices and decrease service calls or returns due to improper installation of the appliance.

Figure 1:
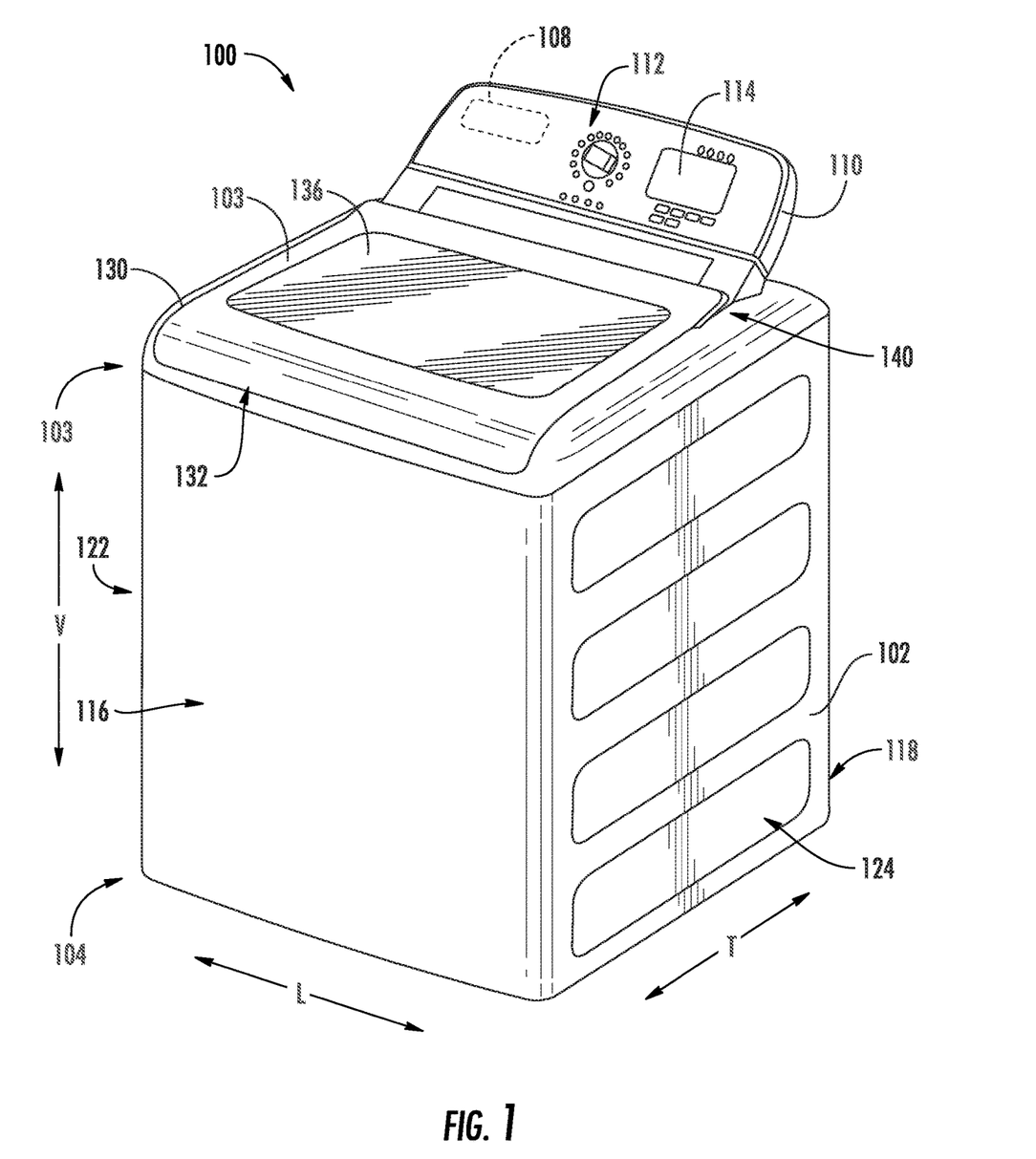
FIG. 1 provides a perspective view of a washing machine appliance according to exemplary embodiments of the present disclosure.
Figure 2:
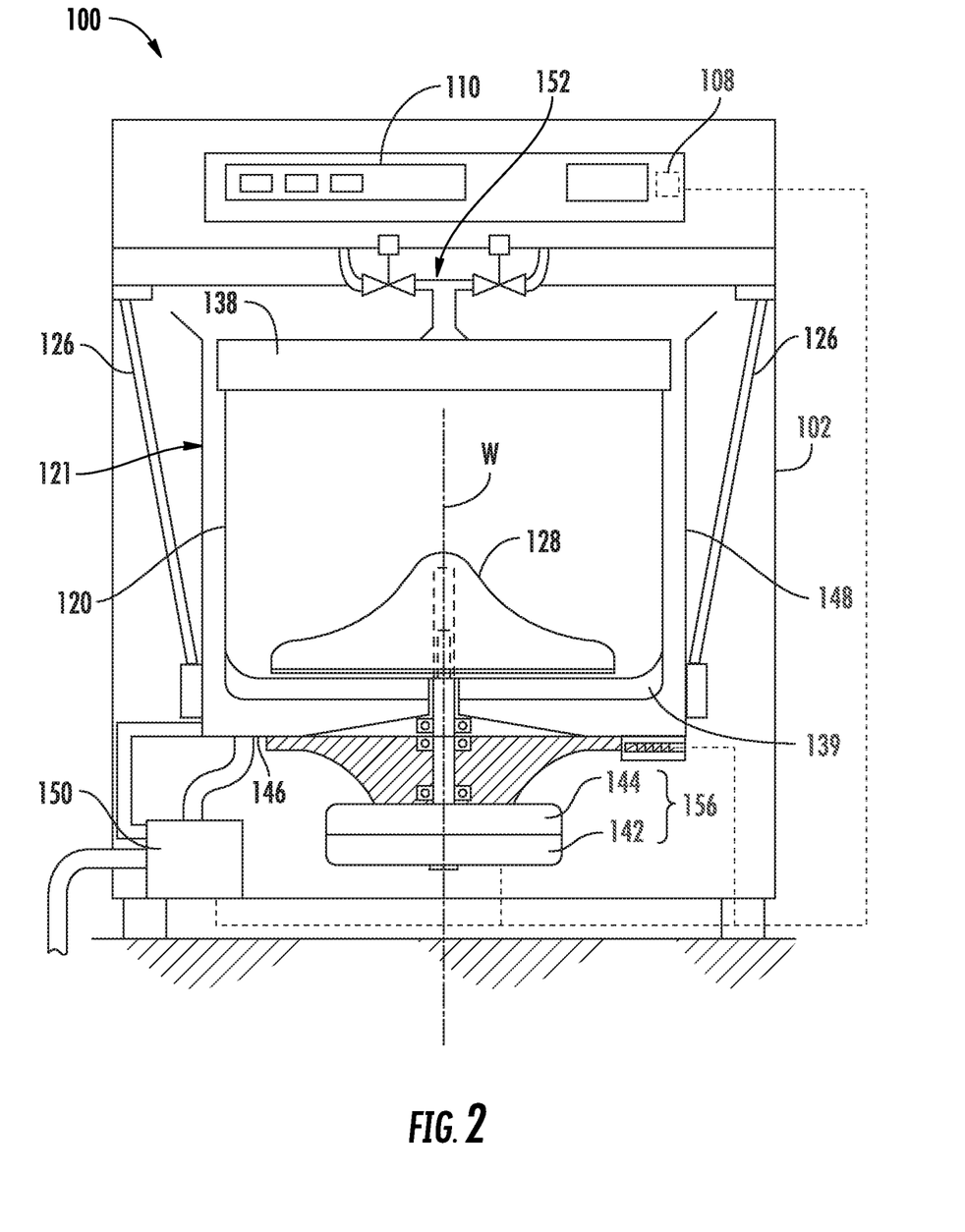
FIG. 2 provides a front section view of the exemplary washing machine appliance of FIG. 1.
Figure 3:
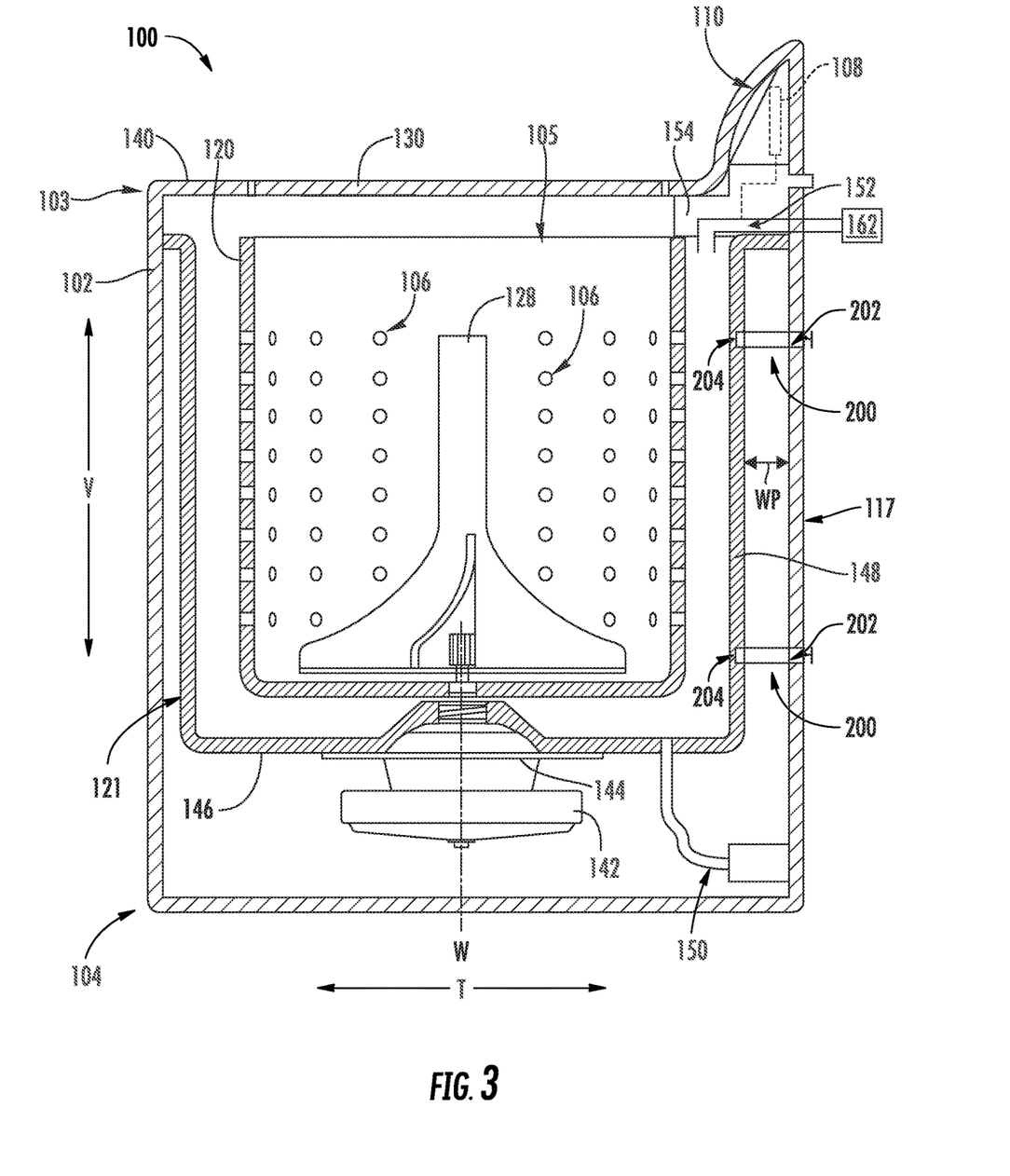
FIG. 3 provides a side cross section view of the exemplary washing machine appliance of FIG. 1.

Turning now to the figures, FIGS. 1, 2, and 3 illustrate an exemplary embodiment of a washing appliance. Specifically, the washing appliance is illustrated as a vertical axis washing machine appliance 100. In FIG. 1, a lid or door 130 is shown in a closed position. FIG. 2 provides a front cross sectional view and FIG. 3 provides a side cross sectional view of certain components of washing machine appliance 100.

Washing machine appliance 100 generally defines a vertical direction V, a lateral direction L, and a transverse direction T, each of which is mutually perpendicular, such that an orthogonal coordinate system is defined. While described in the context of a specific embodiment of vertical axis washing machine appliance 100, using the teachings disclosed herein it will be understood that vertical axis washing machine appliance 100 is provided by way of example only. Other washing appliances having different configurations, different appearances, or different features may also be utilized with the present subject matter as well (e.g., horizontal axis washing machine appliances or front load washing machine appliances).

Washing machine appliance 100 has a cabinet 102 that extends between a top portion 103 and a bottom portion 104 along the vertical direction V. Cabinet 102 may further include a rear panel 118, a front panel 116 located forward of the rear panel 118 in transverse direction T, and a left panel 122 opposing a right panel 124 in the lateral direction L. The cabinet may further include a top panel 140 located perpendicular to the front panel 116, rear panel 118, left panel 122 and right panel 124, the top panel extending in a plane roughly having the lateral direction L and the transverse direction T. The rear panel 118 may extend in a plane roughly having the lateral direction L and the vertical direction V. A wash basket 120 is located within cabinet 102. As shown, wash basket 120 is movably disposed and rotatably mounted in a wash tub 121 in a spaced apart relationship from a tub sidewall 148 and a tub bottom 146. Wash basket 120 is further rotatably mounted within cabinet 102. Basket 120 includes a plurality of perforations 106 therein to facilitate fluid communication between an interior of basket 120 and wash tub 121. A motor 142 may be in mechanical communication with wash basket 120 to selectively rotate wash basket 120 (e.g., about a rotation axis W during an agitation or a rinse cycle of washing machine appliance 100). Wash basket 120 is received within wash tub 121 and is configured for receipt of articles for washing. The wash tub 121 holds wash and rinse fluids for agitation in wash basket 120 within wash tub 121. In optional embodiments, an agitator or impeller 128 extends into wash basket 120 and is also in mechanical communication with motor 142. Impeller 128 may assist agitation of articles disposed within wash basket 120 during operation of washing machine appliance 100.

In some embodiments, cabinet 102 of washing machine appliance 100 has a top panel 140. Top panel 140 defines an opening 105 that permits user access to wash basket 120 of wash tub 121. Door 130, which may be rotatably mounted to top panel 140, permits selective access to opening 105. In particular, door 130 selectively rotates between the closed position shown in FIG. 1 and an open position, not shown. In the closed position, door 130 inhibits access to wash basket 120. Conversely, in the open position, a user can access wash basket 120. In optional embodiments, a window 136 in door 130 permits viewing of wash basket 120 when door 130 is in the closed position (e.g., during operation of washing machine appliance 100). Door 130 also includes a handle 132 that, for example, a user may pull or lift when opening and closing door 130. Further, although door 130 is illustrated as mounted to top panel 140, alternatively, door 130 may be mounted to another portion of cabinet 102 (e.g., to front panel 116) or any other suitable support.

In some embodiments, basket 120 and agitation element 128 are driven by a motor 142 (i.e., rotated about the vertical axis W) through a transmission assembly 144, e.g., such as a clutch assembly. The motor 142 attaches to and rotates basket 120 within wash tub 121. Transmission assembly 144 facilitates driving engagement of basket 120 and agitation element 128 for rotatable movement within wash tub 121, and transmission assembly 144 facilitates relative rotation of basket 120 and agitation element 128 for selected phases of a wash cycle. Motor 142 and transmission and transmission assembly 144 collectively are referenced herein as a motor assembly 156.

Figure 4:
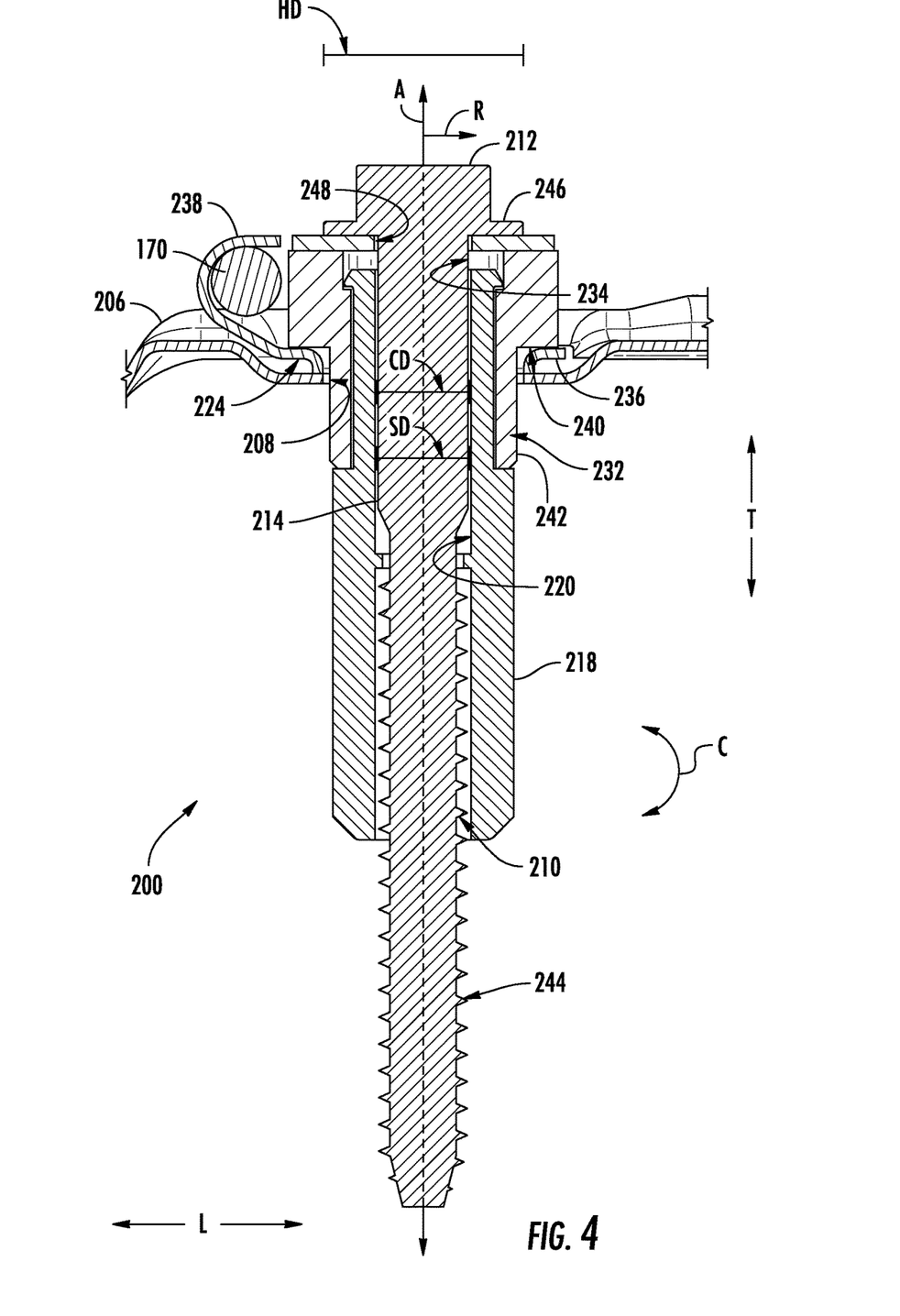
FIG. 4 provides a cross section view of an exemplary shipping spacer assembly according to exemplary embodiments of the present disclosure.

A liquid supply connection 152 may include various valves and conduits to deliver fluid to basket 120 and wash tub 121, as would be understood. Liquid supply connection 152 provides a fresh water supply for use in washing machine appliance 100 when connected to a building plumbing system (e.g., at water supply source 162). A dispenser 154 may also be provided to produce a solution (e.g., wash fluid) by mixing fresh water with a known detergent or other composition for cleansing of articles in basket 120. Tub 121 includes a bottom 104 and a tub side 148, and basket 120 is rotatably mounted within wash tub 121. A pump assembly 150 is located beneath tub 121 and basket 120 for gravity assisted flow when draining tub 121. A power cord 170 (e.g., as shown in FIG. 4) may attach at rear panel 118. Power cord 170 may be configured to connect appliance 100, including a controller 108 or a control panel 110, to an external power source such as an electrical outlet. Power cord 170 may include a cord head 172 and prongs 174 extending form cord head 172. Prongs 174 may be configured to be inserted into the external power source, such as a household power outlet to connect appliance 100 to the external power source, to power the appliance, as would be understood.

As illustrated, basket 120, tub 121, and motor assembly 156 may be supported by a vibration damping suspension system 126. The damping suspension system 126 can include a plurality of damping elements, such as piston-casing damping elements, coupled to the wash tub 121. The damping suspension system 126 can include other elements, such as a balance ring 138 disposed around the upper circumferential surface of the wash basket 120. The balance ring 138 can be used to counterbalance an out of balance condition for the wash machine as the basket 120 rotates within the wash tub 121. The wash basket 120 could also include a balance ring 139 located at a lower circumferential surface of the wash basket 120. During washing operations, damping suspension system 126 generally function to dampen dynamic motion as the wash basket 120 rotates within the wash tub 121, and may be performed as shown or in an equivalent manner, as would be understood.

In certain embodiments, control panel 110, with at least one input selector 112, extends from top panel 140. Control panel 110 and input selector 112 collectively form a user interface input for operator selection of machine cycles and features. A display 114 of control panel 110 indicates selected features, operation mode, a countdown timer, or other items of interest to appliance users regarding operation. Operation of washing machine appliance 100 may be controlled by a controller 108 connected (e.g., electrically coupled) to control panel 110 for user manipulation to select washing machine cycles and features. In response to user manipulation of control panel 110, controller 108 operates the various components of washing machine appliance 100 to execute selected machine cycles and features.

Controller 108 may include a memory (e.g., non-transitive media) and microprocessor, such as a general or special purpose microprocessor operable to execute programming instructions or micro-control code associated with a selected machine cycles and features (e.g., as part of a washing operation). The memory may represent random access memory such as DRAM or read only memory such as ROM or FLASH. In certain embodiments, the processor executes programming instructions stored in memory. The memory may be a separate component from the processor or may be included onboard within the processor. Alternatively, controller 108 may be constructed without using a microprocessor (e.g., using a combination of discrete analog or digital logic circuitry, such as switches, amplifiers, integrators, comparators, flip-flops, AND gates, and the like) to perform control functionality instead of relying upon software. Control panel 110 and other components of washing machine appliance 100 (e.g., one or more sensors, such as a pressure sensor mounted to tub 121) may be in communication with controller 108 via one or more signal lines or shared communication busses.

In some embodiments, during operation of washing machine appliance 100, laundry articles are loaded into wash basket 120 through opening 105, and a washing operation is initiated through operator manipulation of input selectors 112. Wash basket 120 or wash tub 121 may be filled with water and detergent or other fluid additives via an additive dispenser 154. One or more valves can be controlled by washing machine appliance 100 to provide for filling wash basket 120 to the appropriate level for the volume or number of articles being washed or rinsed. By way of example for a wash cycle, once wash tub 121 is properly filled with fluid, the contents of wash tub 121 can be agitated (e.g., with an impeller as discussed previously) for washing of laundry items in wash basket 120.

After the agitation phase of the wash cycle is completed, wash tub 121 can be drained. Laundry articles can then be rinsed (e.g., for a rinse cycle) by again adding fluid to wash basket 120 depending on the specifics of the washing operation selected by a user. Agitation element 128 may again provide agitation within wash basket 120. One or more spin cycles also may be used. In particular, a spin cycle may be applied after the wash cycle or after the rinse cycle to wring wash fluid from the articles being washed. During a spin cycle, wash basket 120 is rotated at relatively high speeds. After articles disposed in wash basket 120 are cleaned or washed, the user can remove the articles from wash basket 120 (e.g., by reaching into wash basket 120 through opening 105).

Turning especially to FIG. 3, a shipping spacer assembly 200 may be attached to wash tub 121. Rear panel 118 defines a spacer hole 202 extending therethrough in transverse direction T. Wash tub 121 further defines a bolt boss 204 extending into wash tub 121. Generally, shipping spacer assembly 200 is removably attached to wash tub 121 for fixing a distance WP between wash tub 121 and cabinet 102 in an installed position. In some embodiments, shipping spacer assembly 200 attaches to wash tub 121 by entering bolt boss 204, a portion of shipping spacer assembly 200 extending between rear panel 118 and wash tub 121. In other words, a portion of shipping spacer assembly 200 extends through spacer hole 202 and into bolt boss 204. Shipping spacer assembly 200 is configured to attach to wash tub 121 by removable receipt through spacer hole 202. Advantageously, fixing distance WP between wash tub 121 and cabinet 102 may allow the wash tub 121 to be rigidly fixed during transportation, preventing wear on suspension system 126 due to movement during transportation.

Figure 5:
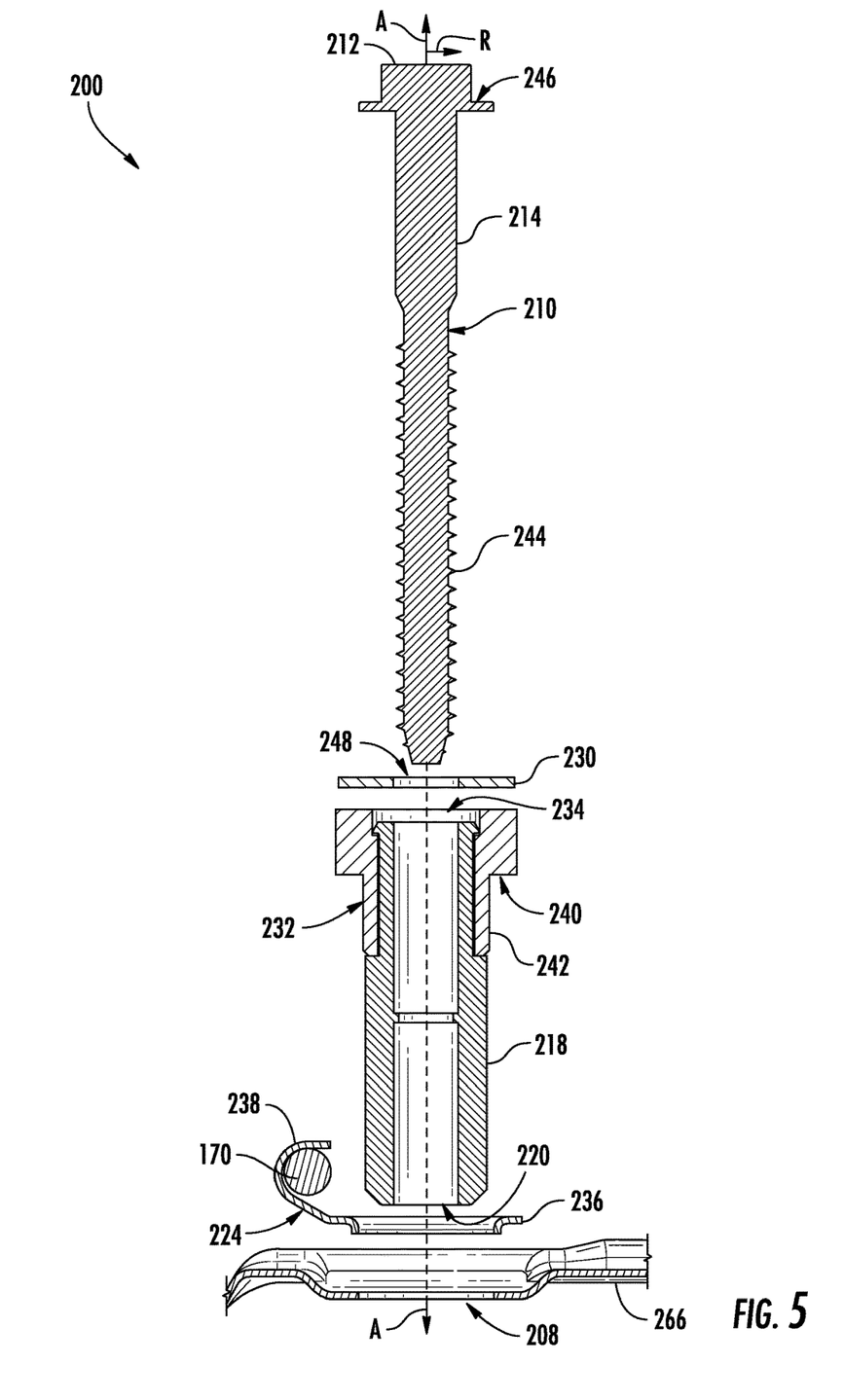
FIG. 5 provides a cross section, exploded view of the exemplary shipping spacer assembly of FIG. 4.
Figure 6:
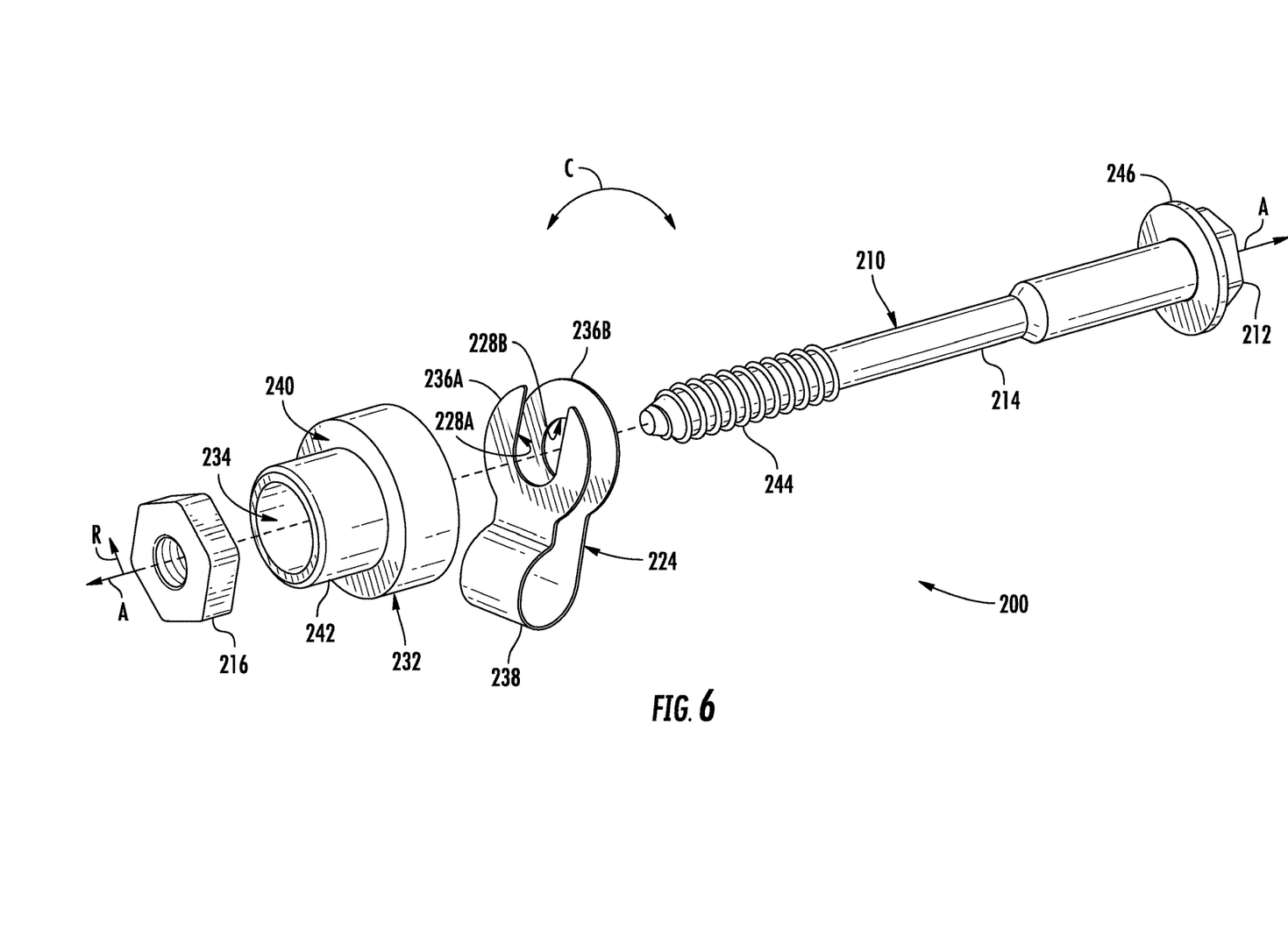
FIG. 6 provides a perspective, exploded view of an exemplary shipping spacer assembly according to exemplary embodiments of the present disclosure.
Figure 7:
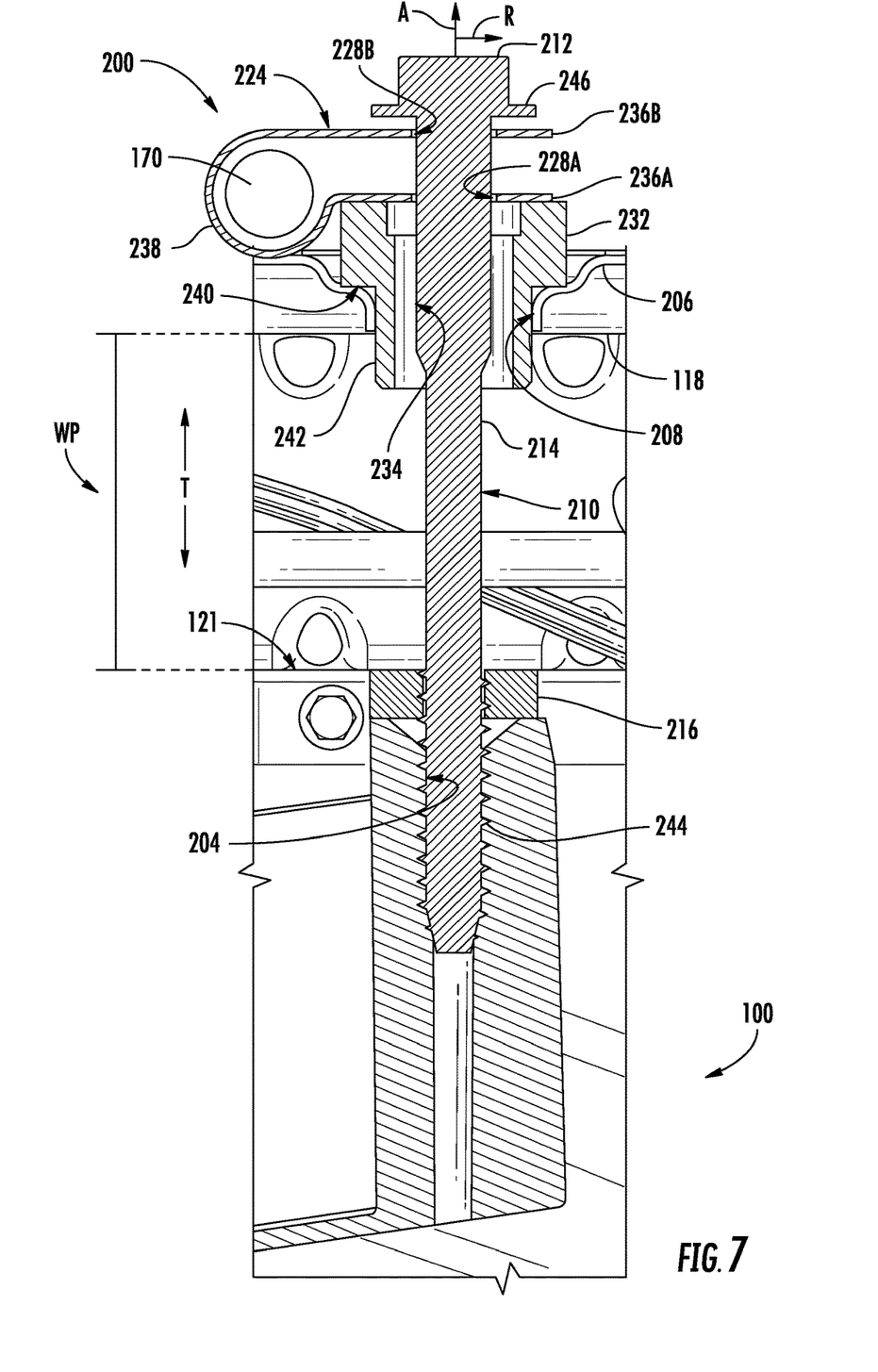
FIG. 7 provides a cross section view of an exemplary shipping spacer assembly installed in an exemplary washing machine appliance according to exemplary embodiments of the present disclosure.
Figure 8:
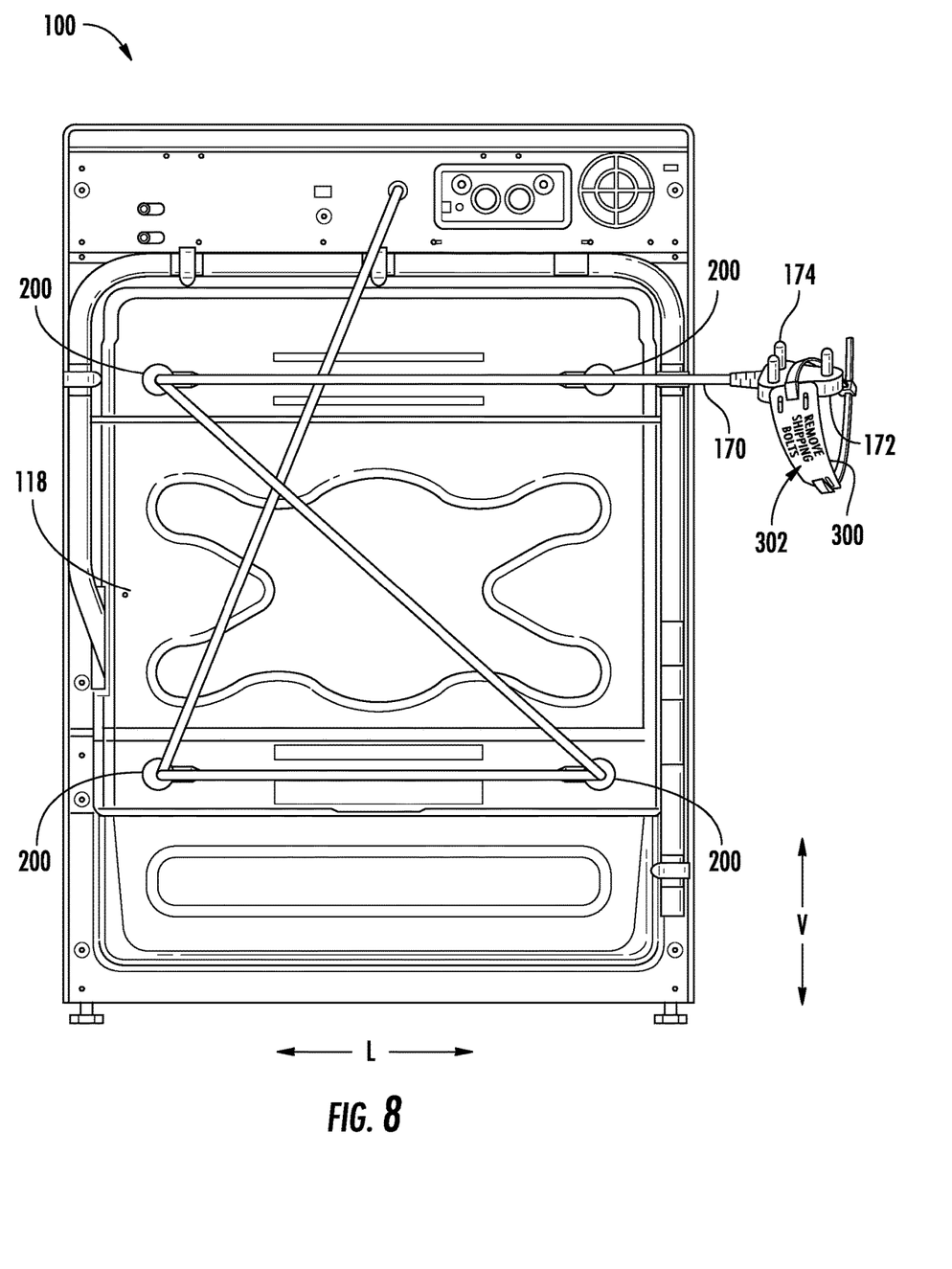
FIG. 8 provides a perspective, rear view of an exemplary washing machine appliance according to exemplary embodiments of the present disclosure.

Turning to FIGS. 4 through 8, embodiments of shipping spacer assembly 200 are depicted, including an installed view in FIGS. 4, 7 and 8, and exploded views in FIGS. 5 and 6. Further, FIG. 8 depicts shipping spacer assemblies 200 installed in rear panel 118 and securing power cord 170 for shipping. Washing machine appliance 100 is shown herein as a top loading washing machine, as an example. Other embodiments of a washing machine appliance may also be used in embodiments, such as a front loading washing machine, a dryer appliance, or another household appliance where stabilization during shipping may be beneficial. Generally, features of washing machine appliance 100 will be described below, with the understanding that other embodiments may include or be provided as another suitable household appliance (e.g., defining an internal chamber).

Washing machine appliance 100 may further include a retention bar 206, as shown in FIGS. 4, 5, and 8. Retention bar 206 may be located on rear panel 118. Generally, retention bar 206 is located transversely behind rear panel 118. Retention bar 206 extends along a width of rear panel 118. In some embodiments, and as shown in FIG. 8, retention bar 206 extends laterally along a portion of rear panel 118. Retention bar 206 may aid in stabilizing washing machine appliance 100 during transportation or during use. Retention bar 206 defines a retention aperture 208. Retention aperture 208 extends through retention bar 206. Retention aperture 208 is configured to removably receive shipping spacer assembly 200. For example, retention aperture 208 receives shipping spacer assembly 200 in installed position (which is shown in FIGS. 4 and 8). Retention aperture 208 may align with spacer hole 202 or with bolt boss 204. For example, retention aperture 208, spacer hole 202 and bolt boss 204 may be aligned with one another along the transverse direction T.

Shipping spacer assembly 200 is configured to attach to wash tub 121 by removable receipt through retention aperture 208. Alternatively, retention bar 206 may not be used, with shipping spacer assembly 200 configured to be seated directly against cabinet 102. For example, shipping spacer assembly 200 may be removably received directly at spacer hole 202 defined on rear panel 118. In some embodiments, a portion of shipping spacer assembly 200 may rest on an exterior side 117 of rear panel 118 adjacent to spacer hole 202 when a portion of shipping spacer assembly 200 is received in bolt boss 204 defined by wash tub 121.

As shown in FIGS. 4 through 7, shipping spacer assembly 200 defines an axial direction A, a radial direction R, and a circumferential direction C. Shipping spacer assembly 200 generally includes a bolt 210, and a spacing feature for fixing distance WP between the wash tub 121 and cabinet 102 (e.g., a spacer 218 or an axial stop 216), a grommet 232, and a cord retention mechanism 224. Generally, elements other than bolt 210 of shipping spacer assembly 200 are removably received onto bolt 210 of shipping spacer assembly 200. Each of the elements of various embodiments of shipping spacer assembly 200 will be described in more detail below.

Bolt 210 of shipping assembly 200 generally includes a shaft 214 extending along the axial direction A, a head 212 located at one end of shaft 214, and a threaded portion 244 located at an opposing end of shaft 214. For example, threaded portion 244 is located opposite head 212 of bolt 210 in the axial direction A.

Generally, bolt 210 is configured to be removably attached to wash tub 121. In some embodiments, bolt 210 is configured to be inserted into spacer hole 202 and attach to bolt boss 204. More specifically, threaded portion 244 may be configured to be removably attached into bolt boss 204 of wash tub 121. Further, threaded portion 244 may be inserted through spacer hole 202 or retention aperture to attach shipping spacer assembly 200 to bolt boss 204. In some embodiments, when threaded portion 244 is received into bolt boss 204, a portion of threaded portion 244 may remain out of bolt boss 204. Alternatively, threaded portion 244 may be sized to fit inside or fit flush with bolt boss 204 when received by bolt boss 204. Receipt of threaded portion 244 within bolt boss 204 may fix distance WP between wash tub 121 and cabinet 102 of washing machine appliance 100, as shown in FIG. 3.

According to exemplary embodiments, head 212 is configured to hold elements of shipping spacer assembly 200 along shaft 214 when shipping spacer assembly 200 is attached to washing machine appliance 100. In this regard, for example, shaft 214 may have a shaft diameter SD and head 212 of bolt 210 may have a head diameter HD greater than shaft diameter SD. In some embodiments, head 212 includes a head flange 246, which attaches to or is defined by shaft 214. Accordingly, head diameter HD of bolt 210 may be largest at head flange 246. Head flange 246 may extend beyond spacer 218 in radial direction R. Head 212 may retain other elements along shaft 214 such as grommet 232 and cord retention mechanism 224, preventing movement of the elements from being removed when shipping spacer assembly 200 is in the installed position, or when threaded portion 244 is attached to bolt boss 204. In other words, head flange 246 and threaded portion 244 received into bolt boss 204 may secure grommet 232 and cord retention mechanism 224 along shaft 214.

Generally, cord retention mechanism 224 is located along shaft 214 of bolt 210, between head 212 and threaded portion 244. As shown in FIGS. 4 and 7, cord retention mechanism 224 may be positioned between head 212 of bolt 210 and rear panel 118 when shipping spacer assembly 200 is in the installed position. Cord retention mechanism 224 includes a connecting tab 236 defining a shaft aperture 228 and a cord retention clip 238. As shown in FIGS. 4 and 5, connecting tab 236 may form an incomplete circle, clasping power cord 170 next to grommet 232. In some embodiments, connecting tab 236 may form a full circle, or hoop (not shown) that surrounds a portion of the power cord. In the examples of FIGS. 4 and 5, cord retention mechanism 224 is further located between grommet 232 and rear panel 118 of cabinet 102. As shown in FIG. 4, power cord 170 may be secured between cord retention clip 238 and grommet 232, with cord retention clip 238 extending beyond grommet 232 in radial direction R.

Additionally or alternatively, and as shown in the embodiments of FIGS. 6 and 7, connecting tab 236 of cord retention mechanism 224 may be a two piece tab, with cord retention clip 238 connecting to a first tab 236A and connecting to a second tab 236B. In some embodiments, each tab 236A, 236B may define a corresponding shaft aperture 228A, 228B, as shown in FIG. 7. Optionally, and as shown in FIG. 6, first tab 236A may form a "U" shape and may define a shaft cavity 228A, with second tab 236B forming an "O" shape and defining a shaft aperture 228B. The power cord 170 may be in clip 238, sandwiched between first tab 236A and second tab 236B, encasing a portion of power cord 170.

According to exemplary embodiments, shaft 214 may be removably received through shaft aperture 228 of cord retention mechanism 224. As shown in FIGS. 4 through 7, cord retention clip 238 extends from connecting tab 236. In this regard, cord retention clip 238 extends adjacent to shaft 214. A portion of power cord 170 may be received through cord retention clip 238. Cord retention clip 238 may further hold power cord 170 against rear panel 118.

During use, power cord 170 may be removable from cord retention mechanism 224 only upon removal of cord retention mechanism 224 from bolt 210. Additionally or alternatively, cord retention mechanism 224 may be only removable from bolt 210 following removal of grommet 232 from bolt 210 and following bolt 210 being removed from rear panel 118. Thus, access to the power cord 170 may be predicated on removal of shipping spacer assembly 200, including bolt 210, grommet 232, and cord retention mechanism 224 from cabinet 102 of washing machine appliance 100. Advantageously, removal of the power cord 170 by removal of the shipping spacer assembly 200 may avoid or decrease the probability of bolts or spacers being left in the washing machine appliance 100 during use. In some embodiments, cord retention mechanism 224 is made of metal (e.g., sheet metal) or another material difficult to cut, but pliable enough to not damage power cord 170 when power cord 170 is received in cord retention clip 238. In this manner, a user attempting to remove the power cord 170 would be encouraged to remove the shipping spacer assembly 200 instead of attempting to cut the cord retention clip 238.

Generally, grommet 232 is located along shaft 214 between head 212 and threaded portion 244. Grommet 232 of shipping spacer assembly 200 may define a grommet cavity 234. Shaft 214 is removably positioned through grommet cavity 234. Further, grommet 232 may define a grommet shoulder 240. Grommet shoulder 240 may extend in radial direction R from a central shaft 242 of grommet 232. As shown in the embodiments of FIGS. 4 and 5, cord retention mechanism 224 may abut grommet shoulder 240, grommet shoulder 240 located between cord retention mechanism 224 and head 212 of bolt 210. In other words, cord retention mechanism 224 is located between grommet shoulder 240 and threaded portion 244. When in the installed position, as shown in FIG. 4, cord retention mechanism 224 may be sandwiched between grommet shoulder 240 and retention bar 206 or cabinet 102.

In some embodiments, grommet 232 touches head 212. Grommet 232 may be attached to spacer 218. Such may include or be provided as a unitary feature. In some embodiments, and as shown in FIG. 6, grommet cavity 234 may receive a portion of spacer 218 as well as shaft 214. Spacer 218 may extend from grommet 232 behind retention bar 206 or rear panel 118 at spacer hole 202 or retention aperture 208. As shown installed in FIG. 6, at least a portion of grommet 232 may be external to rear panel 118 when shipping spacer assembly 200 is attached to wash tub 121. Additionally or alternatively, grommet 232 may be external to retention bar 206. In some embodiments, grommet 232 is affixed to spacer 218. Advantageously, grommet 232 being affixed to spacer 218 may promote removal of shipping spacer assembly 200 as grommet 232 visibly needs to be removed in order to access cord retention mechanism 224 or power cord 170, indicating to the user installing appliance 100 that bolt 210 needs to be removed, and spacer 218 is attached to grommet 232, so it will be removed with grommet 232.

For the illustrated embodiments of FIGS. 4 and 5, shipping spacer assembly 200 may further include a spacer 218. Spacer 218 is sized to fix a distance WP between wash tub 121 and rear panel 118, as shown in FIG. 3. As shown in FIG. 3, spacer 218 extends between and may connect wash tub 121 and rear panel 118. In other words, spacer 218 may be physically touching wash tub 121 and rear panel 118 during attachment of shipping spacer assembly 200 to wash tub 121.

In embodiments with spacer 218, spacer 218 may define a spacer cavity 220. Spacer cavity 220 extends along axial direction A. Spacer cavity 220 removably receives shaft 214 of bolt 210. Generally, spacer cavity 220 is sized to fit shaft 214 of bolt 210, spacer cavity 220 defined as a space with a diameter CD smaller than diameter HD of head 212. Thus, during use or when shipping spacer assembly 200 is attached to washing machine appliance 100, spacer 218 is irremovable from shaft 214. In other words, bolt 210 is removable from spacer 218 and spacer cavity 220 by moving spacer 218 towards threaded portion 244 and restrained on shaft 214 by moving spacer 218 towards head 212.

Spacer 218 is generally located between head 212 and threaded portion 244. As shown in FIGS. 4 and 5, spacer 218 may be affixed or attached to grommet 232. During assembly, cord retention mechanism 224 may removably receive spacer 218 and/or grommet 232 at shaft aperture 228, with cord retention mechanism 224 abutting grommet shoulder 240. Further, spacer 218 and grommet 232 may removably receive shaft 214 at spacer cavity 220 and grommet cavity 234, respectively. The use of "and/or" in this paragraph is used as grommet 232 and spacer 218 are a unitary feature in some embodiments and are two separate elements of shipping spacer assembly 200 in some embodiments, and that both are needed to be removed together when they are a unitary feature, but that only one of the two elements (e.g., spacer 218) may need to be removed if the elements are separate. In this manner, cord retention mechanism 224 may be removed from bolt 210 only upon removal of spacer 218 and/or grommet 232 from shaft 214 of bolt 210. Further, bolt 210 needs to be removed from bolt boss 204 and rear panel 118 of washing machine appliance 100 before spacer 218 and/or grommet 232 can be removed from bolt 210. Advantageously, in order to get power cord 170 out of cord retention clip 238, bolt 210 must first be removed with spacer 218 and/or grommet 232, so the appliance installation procedure of gaining access to power cord 170 includes the removal of spacers 218 and bolts 210 from washing machine appliance 100. This may reduce or eliminate shipping spacer assemblies 200 being left in washing machine appliance 100 during use of washing machine appliance 100.

As shown in FIGS. 4 and 5, some embodiments of shipping spacer assembly 200 may include a washer 230. Washer 230 may define a washer hole 248. Shaft 214 may be removably received through washer hole 248. Washer 230 may be located between head 212 and grommet 232. Advantageously, washer 230 may aid in seating shipping spacer assembly 200 in bolt boss 204, as would be understood. In certain embodiments, washer 230 may be necessary to prevent head 212 (e.g., head flange 246) from digging into grommet 232 when shipping spacer assembly 200 is in the installed position.

As shown in FIGS. 6 and 7, shipping spacer assembly 200 may include an axial stop 216. Axial stop 216 may aid bolt 210 in fixing the distance between wash tub 121 and cabinet 102 and may be used instead of spacer 218 in that capacity. Axial stop 216 may be fixed in axial direction A along shaft 214. In the installed position of shipping spacer assembly 200, axial stop 216 may be seated against wash tub 121, as shown in FIG. 7 to fix the distance between wash tub 121 and rear panel 118 of cabinet 102. In some embodiments, and as shown, axial stop 216 may be a threaded nut that is locked onto threaded portion 244 of bolt 210.

In some embodiments, axial stop 216 may be an equivalent structure locked onto threaded portion 244 of bolt 210 including a peg inserted into a hole defined in bolt 210, a rivet extending out from bolt 210 at the threaded portion 244, or equivalent rigid structures. For example, axial stop 216 may be threaded fully onto threaded portion 244 of bolt 210, proximate to head 212. In examples with threaded portion 244 received into bolt boss 204 and axial stop 216 seated against wash tub 121, bolt 210 with axial stop 216 fixes the distance between rear panel 118 and wash tub 121. Thus, axial stop 216 may replace spacer 218 in such embodiments. Advantageously, embodiments with axial stop 216 may have no spacer, and thus no spacer may be accidentally left in washing machine appliance 100 during use of appliance 100. Additionally, suspension system 126 may not be worn out during transportation as shipping spacer assembly 200 still fixes the distance between wash tub 121 and cabinet 102 during transportation.

Additionally or alternatively, as shown in the embodiments of FIGS. 6 and 7, cord retention mechanism 224 may be located between head 212 and grommet 232. Embodiments with an axial stop 216 may further have no need for washer 230, with cord retention mechanism 224 being made of a similarly rigid material to washer 230 and may aid in seating shipping spacer assembly 200 in bolt boss 204. Thus, washer 230 may be unused in embodiments like that shown in FIGS. 6 and 7, without losing integrity of the fixed placement of wash tub 121 and cabinet 102 made by shipping spacer assembly 200.

As shown in FIG. 6, head 212, grommet 232 and cord retention mechanism 224 of bolt 210 are located external to rear panel 118. Additionally or alternatively, head 212, grommet 232 and cord retention mechanism 224 of bolt 210 are located external to retention bar 206. As shown in FIGS. 6 and 8, spacer 218 and thread portion of bolt 210 are located internal to washing machine appliance 100, spacer 218 fixing distance WP between rear panel 118 and wash tub 121.

In some embodiments, and as shown in FIG. 8, washing machine appliance 100 may comprise at least two shipping spacer assemblies 200. Each shipping spacer assembly 200 may be removably attached to rear panel 118. Rear panel 118 may define at least two spacer holes 202. In certain embodiments, washing machine appliance 100 may comprise four shipping spacer 218 assemblies with rear panel 118 defining four spacer holes 202. There may be a corresponding number of spacer holes 202 to shipping spacer assemblies 200. Each shipping spacer assembly 200 of washing machine appliance 100 may be removably attach to rear panel 118 at each respective spacer hole 202. A portion of each shipping spacer assembly 200 may be located between rear panel 118 and wash tub 121, as shown in FIG. 3.

As shown in FIG. 8, embodiments may include a tag 300 attached to power cord 170. In some examples, tag 300 may be attached to power cord head 172 between prongs 174. Tag 300 may include a message 302 to remove shipping spacer assemblies 200 from cabinet 102. Placement of tag 300 between prongs 174 may increase the likelihood of message 302 of tag 300 being viewed by a user installing washing machine appliance 100, and thus may increase the likelihood of shipping spacer assemblies 200 being removed from washing machine appliance 100 prior to use of appliance 100.

Embodiments described herein may further relate to safety improvements in a front load washing machine appliance by ensuring the removal of shipping bolts or spacers using a sheet metal extruded hole power cord retaining clip. Generally, a shipping spacer assembly may be used to arrest the free motion of a suspended sub washer system (e.g., wash tub 121 and wash basket 120) during shipment to prevent damage and may ensure the safe handling of the appliance during shipping. At the same time, during operation or in running condition, the sub washer (e.g., wash tub 121 and wash basket 120) must swing freely. Therefore, the shipping bolts and shipping spacers should be removed before the user uses the washing machine. Hence, an advantage or objective of the present subject matter is to ensure that the shipping bolts and shipping spacers are removed immediately after installation.

Embodiments described herein may include shipping spacer assemblies made of shipping bolts, shipping spacers, and extruded sheet metal power cord retaining clips. The shipping spacer assembly may be removed as a single piece to avoid the shipping spacer being left in the appliance after installation. The shipping bolt with washer may be inserted through the hole in the shipping spacer and then through the power cord retaining clip which may hold the power cord. Before shipping the washing machine appliance, all the shipping bolt assemblies may be assembled to fix the sub washer to the structure to prevent damage while shipping. Before installing the washing machine appliance, the user may need to disassemble all the shipping bolt assemblies from the washing machine to get full access to the power cord. Users may retain all shipping bolt assemblies in a safe place as the shipping bolt assemblies may be desired for assembling in future shipping of the washing machine appliance. Embodiments described herein may provide ease for users to assemble and disassemble the shipping spacer assembly to the washing machine appliance and may secure the power cord without any damage as the power cord retaining clip may be made of sheet metal or an equivalent material.

Embodiments described herein may further describe an arrangement to provide shipping bolt with power cord retaining clip configured to hold the power cord. A user may not be able to remove the power cord before removing the shipping spacer assembly as a single piece. The shipping spacer assembly may be made of four parts: a shipping bolt, a bushing or grommet, a power cord retaining clip, and a nut. The assembly process may begin by placing the power cord in power cord retainer clip, pushing the power cord retainer clip into position, fastening the shipping bolt with inserted grommet or bushing, and placing the over tightened nut on the bolt in place of a spacer. This shipping spacer assembly may be used to fix the sub washer (e.g., drum, or wash tub) to the structure (e.g., cabinet) to prevent damage while shipping.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance comprising:
   a cabinet having a rear panel;
   a wash tub located within the cabinet;
   a power cord configured to connect the washing machine appliance to an external power source; and
   a shipping spacer assembly removably attached to the wash tub for fixing a distance between the wash tub and the cabinet in an installed position, the shipping spacer assembly defining an axial direction, a radial direction, and a circumferential direction, the shipping spacer assembly comprising:
      a bolt comprising a shaft extending along the axial direction, a head located at one end of the shaft, and a threaded portion located opposite the head in the axial direction;
      a cord retention mechanism configured for receipt of the power cord, and located along the shaft of the bolt, the cord retention mechanism being positioned between the head of the bolt and the rear panel when the shipping spacer assembly is in the installed position; and
      a grommet defining a grommet cavity, the shaft removably positioned through the grommet cavity, wherein the cord retention mechanism is located between the grommet and the rear panel of the cabinet.

2. The washing machine appliance of claim 1, wherein the shipping spacer assembly further comprises a spacer defining a spacer cavity, the shaft removably received through the spacer cavity in the installed position, and the spacer attached to the grommet.

3. The washing machine appliance of claim 2, wherein the grommet defines a grommet shoulder, and
   wherein the cord retention mechanism abuts the grommet shoulder, the grommet shoulder located between the cord retention mechanism and the head of the bolt.

4. The washing machine appliance of claim 1, wherein the wash tub defines a bolt boss removably receiving the threaded portion of the bolt,
   wherein the head comprises a head flange that extends circumferentially beyond the shaft in the radial direction, and
   wherein the head flange and threaded portion secure the grommet and the cord retention mechanism along the shaft in the installed position.

5. The washing machine appliance of claim 1, the shipping spacer assembly further comprising a washer defining a washer hole, the shaft removably received through the washer hole, the washer located between the head of the bolt and the grommet.

6. The washing machine appliance of claim 1, wherein the cord retention mechanism comprises a connecting tab defining a shaft aperture and a cord retention clip extending from the connecting tab,
   wherein the shaft is removably received through the shaft aperture of the cord retention mechanism, and
   wherein a portion of the power cord is received through the cord retention clip.

7. The washing machine appliance of claim 6, wherein the power cord is secured between the cord retention clip and the grommet, the cord retention clip extending beyond the grommet in the radial direction.

8. The washing machine appliance of claim 1, wherein the power cord is retained in the cord retention mechanism, the power cord removable from the cord retention mechanism only upon removal of the cord retention mechanism from the bolt.

9. The washing machine appliance of claim 1, wherein the cord retention mechanism is only removable from the bolt following removal of the grommet from the bolt and the bolt from the rear panel.

10. The washing machine appliance of claim 1, wherein the wash tub defines a bolt boss removably receiving the threaded portion of the bolt, the shipping spacer assembly further comprising:
    an axial stop, the axial stop fixed along the shaft in the axial direction and being seated against the wash tub when the shipping spacer assembly is in the installed position to fix the distance between the wash tub and the rear panel of the cabinet.

11. The washing machine appliance of claim 10, wherein the axial stop comprises a threaded nut that is locked onto the threaded portion of the bolt.

12. The washing machine appliance of claim 1, wherein the cord retention mechanism is located between the grommet and the head of the bolt.

13. The washing machine appliance of claim 1, wherein the shipping spacer assembly is a first shipping spacer assembly and the rear panel defines a first spacer hole and a second spacer hole, the first shipping spacer being removably received within the first spacer assembly, the washing machine appliance further comprising:
    a second shipping spacer assembly removably attached to the rear panel at the second spacer hole.

14. A shipping spacer assembly configured to be removably attached to a wash tub of a washing machine appliance for fixing a distance between the wash tub and a cabinet of the washing machine appliance in an installed position, the shipping spacer assembly defining an axial direction, a radial direction and a circumferential direction, the shipping spacer assembly comprising:
    a bolt comprising a shaft extending along the axial direction, a head located at one end of the shaft, and a threaded portion located opposite the head in the axial direction;
    a cord retention mechanism configured for receipt of a power cord, and located along the shaft of the bolt, the cord retention mechanism configured to be positioned between the head of the bolt and the cabinet when the shipping spacer assembly is in the installed position; and
    a grommet defining a grommet cavity, the shaft removably positioned through the grommet cavity, wherein the cord retention mechanism is located between the grommet and the rear panel of the cabinet.

15. The shipping spacer assembly of claim 14, wherein the grommet defines a grommet shoulder, and wherein the cord retention mechanism abuts the grommet shoulder, the grommet shoulder located between the cord retention mechanism and the head of the bolt.

16. The shipping spacer assembly of claim 14, wherein the cord retention mechanism comprises a connecting tab defining a shaft aperture and a cord retention clip extending from the connecting tab, wherein the shaft is removably received through the shaft aperture of the cord retention mechanism, and wherein the cord retention clip is configured for receiving a portion of the power cord.

17. The shipping spacer assembly of claim 14, wherein the cord retention mechanism is only removable from the bolt following removal of the grommet from the bolt and the bolt from the cabinet.

18. The shipping spacer assembly of claim 14, the shipping spacer assembly further comprising an axial stop, the axial stop fixed axially along the shaft and configured to be seated against the wash tub when the shipping spacer assembly is in the installed position to fix the distance between the wash tub and the cabinet.

19. The shipping spacer assembly of claim 18, wherein the axial stop comprises a threaded nut that is locked onto the threaded portion of the bolt.

20. The washing machine appliance of claim 1, wherein the cord retention mechanism comprises:

a first tab forming a U-shape; and a second tab forming an O-shape.

* * * * *